(12) United States Patent
Mahlein et al.

(10) Patent No.: US 6,744,650 B2
(45) Date of Patent: Jun. 1, 2004

(54) METHOD FOR CONTROLLING A MATRIX CONVERTER

(75) Inventors: Jochen Mahlein, Karlsruhe (DE); Olaf Simon, Bruchsal (DE)

(73) Assignee: Siemens AG, München (DE)

( * ) Notice: Subject to any disclaimer, the term of this patent is extended or adjusted under 35 U.S.C. 154(b) by 0 days.

(21) Appl. No.: 10/443,656

(22) Filed: May 22, 2003

(65) Prior Publication Data

US 2004/0027843 A1 Feb. 12, 2004

Related U.S. Application Data

(63) Continuation of application No. PCT/DE01/04323, filed on Nov. 16, 2001.

(30) Foreign Application Priority Data

Nov. 22, 2000 (DE) .......................................... 100 57 785

(51) Int. Cl.⁷ ................................................ H02M 5/00
(52) U.S. Cl. ..................................... 363/149; 363/148
(58) Field of Search .................................. 363/148, 149, 363/50; 361/93.9

(56) References Cited

U.S. PATENT DOCUMENTS

| | | | |
|---|---|---|---|
| 4,041,368 A | | 8/1977 | Gritter |
| 5,594,636 A | | 1/1997 | Schauder |
| 5,892,677 A | * | 4/1999 | Chang ........................ 363/152 |
| 6,496,343 B2 | * | 12/2002 | Mahlein et al. ............ 361/91.1 |
| 2003/0202369 A1 | * | 10/2003 | Schierling et al. .......... 363/131 |

FOREIGN PATENT DOCUMENTS

| | | |
|---|---|---|
| DE | 195 04 690 | 3/1996 |
| DE | WO 02/43234 A2 * | 5/2002 |
| GB | 2 048 588 | 12/1980 |

OTHER PUBLICATIONS

A. Alesina et al.: "Analysis and design of optimum–amplitude nine–switch direct ac—ac converters", in: Transactions on Power Electronics, Jan. 1989.
Nielsen et al.: "Space vector modulated matrix converter with minimized number of switchings and a feedforward compensation of input voltage unbalance", in: Proceedings 96, 1996, no month.
Mahlein et al.: "A matrix converter without diode clamped over–voltage protection", in: Konferenzbd. IPEMC, 2000, no month.
Ziegler et al.: "A new two steps commutation policy for low cost matrix converters", in: Conference Proceedings "PCIM 200 Europe", Sep. 2000.

* cited by examiner

*Primary Examiner*—Shawn Riley
(74) *Attorney, Agent, or Firm*—Henry M. Feiereisen

(57) ABSTRACT

A method is described for controlling a matrix converter which includes nine bi-directional circuit-breakers arranged in a 3×3 switch matrix. A commutation sequence is selected based on detected linked input voltages and a predetermined limit value and compared with a calculated commutation sequence. If these two do not agree, the switching states of the calculated commutation sequence are rearranged into the selected commutation sequence. In this way, it is possible to operate a matrix converter without requiring a precise measurement of the polarity of the input voltages, which eliminates the risk of a commutation short circuit.

4 Claims, 5 Drawing Sheets

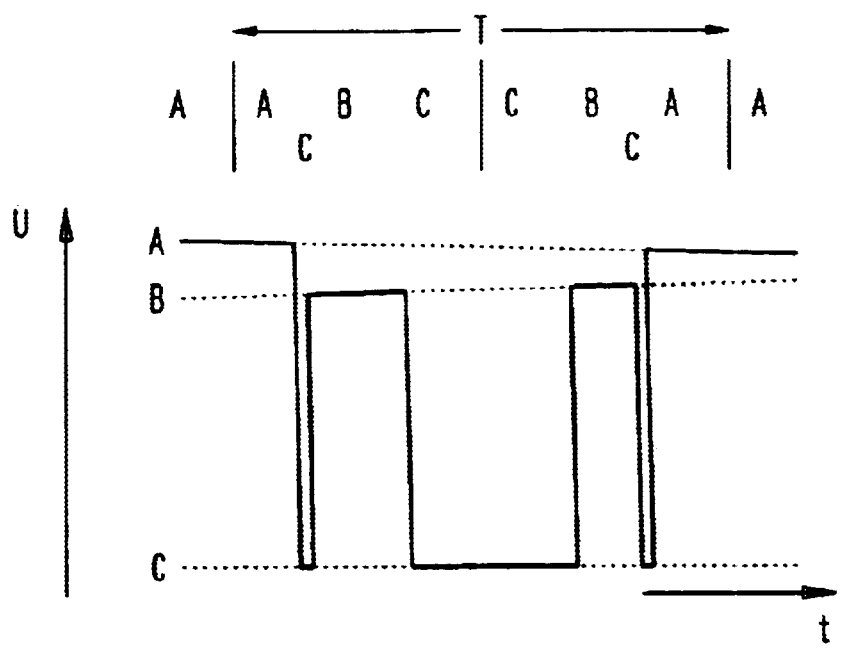
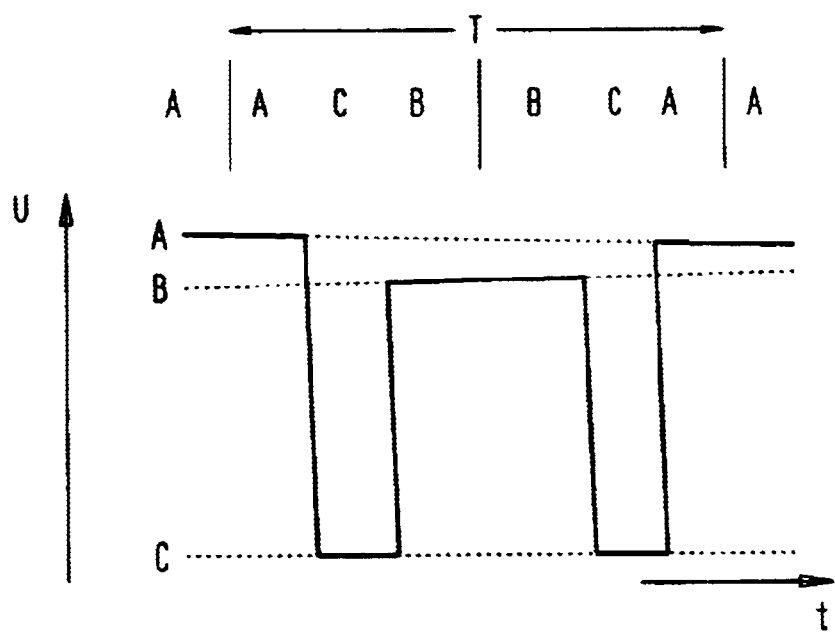

FIG. 7

| TIME INTERVAL | SWITCHING STATE |
|---|---|
| $T_{\alpha\mu}$ = b | 121 |
| $T_{\beta\mu}$ = a | 122 |
| $T_{\beta\nu}$ = e | 133 |
| $T_{\alpha\nu}$ = d | 131 |
| $T_0$ = c | 111 |

FIG. 8

| TIME INTERVAL | SWITCHING STATE |
|---|---|
| $T_{\beta\mu}$ = a | 122 |
| $T_{\alpha\mu}$ = b | 121 |
| $T_0$ = c | 111 |
| $T_{\alpha\nu}$ = d | 131 |
| $T_{\beta\nu}$ = e | 133 |

METHOD FOR CONTROLLING A MATRIX CONVERTER

CROSS-REFERENCES TO RELATED APPLICATIONS

This application is a continuation of prior filed copending PCT International application No. PCT/DE01/04323, filed Nov. 16, 2001, on which priority is claimed under 35 U.S.C. §120, the disclosure of which is hereby incorporated by reference.

This application claims the priority of German Patent Application, Serial No. 100 57 785.7, filed Nov. 22, 2000, pursuant to 35 U.S.C. 119(a)–(d), the disclosure of which is incorporated herein by reference.

BACKGROUND OF THE INVENTION

The present invention relates to a method for controlling a matrix converter, in particular a matrix converter with nine bidirectional power switches arranged in a 3×3 switch matrix.

A matrix converter is a self-commutated direct converter. It enables the conversion of a constant three-phase system into a system with variable voltage and frequency. Through the arrangement of the bidirectional power switches in a 3×3 switch matrix, each of the three output phases of the matrix converter can be electrically connected to any one input phase. One phase of the matrix converter includes an arrangement of three bidirectional power switches wherein each switch is connected, on the one hand, to an input phase and, on the other hand, to an output phase. An arrangement of this type is also referred to as a 3×1 switch matrix. The matrix converter does not require an intermediate circuit. Due to its topology, the self-commutated direct converter advantageously has a recovery capability and achieves sinusoidal mains currents through a suitably designed control.

Each of the bidirectional power switches of the matrix converter has two anti-serially connected semiconductor switches. Insulated Gate Bipolar Transistors (IGBT) are preferably used as semiconductor switches, which each include an antiparallel diode. Bidirectional power switches designed in this way are preferably used in converters for small and medium power. Through the control of these semiconductor switches of the bidirectional power switches, a continuous current path is established in a direction determined by the arrangement of the semi-conductor switches. If both semiconductor switches of a bidirectional power switch are controlled, the latter is bidirectionally activated and a current can flow in both directions. This creates a safe electrical connection between an input phase and an output phase of the matrix converter. If only one semiconductor switch of a bidirectional power switch is controlled, the latter is unidirectionally activated, creating an electrical connection between an input phase and an output phase of the matrix converter only for a preferred current direction.

Any desired time-averaged output voltage can be obtained—within certain limits—by a controlled temporal sequence of combinations of switch positions within a modulation period. A matrix converter includes a controller capable of computing a suitable switch combination based on information about the input voltage space vector and a desired value for the output voltage space vector.

Conventional control methods operate either according to a phase-oriented or a vector-oriented method.

The phase-oriented control method is described in the publication "Analysis and Design of Optimum-Amplitude Nine-Switch Direct AC-AC Converters", by Alberto Alesina and Marco G. B. Venturini, IEEE Transactions on Power Electronics, Vol. 4, No. 1, January 1989, pp. 101–112. The space vector control method is described in "Space Vector Modulated Three-Phase to Three-Phase Matrix Converter with Input Power Factor Correction", by László Huber and Dušan Borejević, IEEE Transactions on Industrial Applications, Vol. 31, No. 6, November/December 1995, pp. 1234–1245.

To prevent an open circuit of the load current it or a short circuit of two input phases A, B of a matrix converter from occurring at any time, a defined switching sequence has to be observed. The publication "A Matrix Converter without Diode Clamped Over-Voltage Protection", J. Mahlein and M. Braun, Conf. Proceed. "IPEMC", 2000, Beijing, China, in particular Chapter 3, describes possible commutation sequences for an output phase of a matrix converter. The commutation from the state semiconductor switches S1 and S2 conducting and semiconductor switches S3 and S4 blocking into the state semiconductor switches S1 and S2 blocking and semiconductor switches S3 and S4 conducting will, now be described based on the figures in the reference, which are reproduced herein as FIGS. 1 and 2.

As seen in FIG. 1, an output phase of a matrix converter 2 has three bidirectional power switches 4 which are arranged in a 3×3 switch matrix. As also seen in FIG. 1, each bidirectional power switch 4 includes two antiserially connected power switches S1, S2 and/or S3, S4 and/or S5, S6, which each include an antiparallel connected diode. The illustrated semiconductor switches S1, S2, S3, S4, S5, and S6 are implemented as Insulated-Gate-Bipolar-Transistors (IGBT). Each of the antiparallel connected diodes forms a component of the associated IGBT module. Each semiconductor switch S1, S2, S3, S4, S5, S6 of the bidirectional power switches 4 of this phase of the matrix converter 2 can be controlled separately and independently. A switch is regarded as being switched on bidirectionally, if both semiconductor switches S1, S2 and/or S3, S4 and/or S5, S6 of a bidirectional power switch 4 are driven. If only one of the semiconductor switches S1, S2 and/or S3, S4 and/or S5, S6 of a bidirectional power switch 4 are driven, then the switch is called a unidirectionally switched-on switch.

FIG. 2 shows all possible commutation sequences for commutating from the state semiconductor switches S1 and S2 conducting and semiconductor switches S3 and S4 blocking into the state semiconductor switches S1 and S2 blocking and semiconductor switches S3 and S4. These possible commutation sequences depend on information about the polarity of the voltage and/or current and can be divided into three groups. The switching sequences that are not marked can be performed only when the polarity of both the voltage and the current are known and are not of technical interest because two pieces of information are required. A second group surrounded by a dashed line is independent of the voltage polarity and only requires information about the polarity of the current. The third group surrounded by a dash-dotted line is independent of the current polarity and only requires information about the polarity of the voltage. These switching sequences are also referred to as voltage-controlled commutation.

The following discussion is limited to voltage-controlled commutation.

If an erroneous measurement of the voltage polarity with voltage-controlled commutation results in a selection of the wrong switching sequence, then a short circuit occurs in the linked input voltage. This does not cause any technical problems as long as the amplitude of the input voltage is smaller than the turn-on voltage of the semiconductor valves in the short current path, which is approximately 10 V when implemented using IGBT's. The voltage-controlled commutation hence requires a precise measurement technique for measuring the voltage polarity. Typically employed analog measurements of the input voltage which are required for controlling the matrix converter are not adequate, so that additional electronic components are required. The required high precision is also vulnerable and does not lend itself to a desired robust solution of the commutation problem.

The publication "A New Two Steps Commutation Policy For Low Cost Matrix Converters", M. Ziegler and W. Hofmann, Conf. Proc. "PCIM 200 Europe", Nürnberg, September 2000, proposes a control method with relaxed requirements for determining the voltage polarity. The control method described in this reference will now be described based on a time-dependent diagram of an output phase with pulse-width modulation as depicted in FIG. 3.

The three-phase matrix converter 2 has nine bidirectional power switches 4, which are arranged in a 3×3 switch matrix 6. The arrangement of the nine bidirectional power switches 4 in a 3×3 switch matrix 6 allows each output phase X, Y, Z to be switched to any desired input phase U, V, W. An inductive load 8 is connected to the output phases X, Y, Z of the matrix switch 2. The input phases U, V and W are connected with an LC-filter 10, which is connected on the input side to a power mains system 12. The LC filter 10 includes inductors 14 and capacitors 16. The capacitors 16 are shown here in a star configuration, although a delta configuration is also possible. The inductors 14 are arranged in the supply lines to the capacitors 16, thereby smoothing the charge currents. One phase of the matrix converter 2 has three bidirectional power switches 4 adapted to connect an output phase X or Y or Z, respectively, with the input phases U, V, W. This matrix converter phase has a 3×1 switch matrix.

The equivalent circuit diagram of the exemplary three-phase matrix converter 2 also shows a control device 18, a modulation device 20 and nine driver devices 22. The control device 18 includes a load regulator 24 and a control set 26. The load regulator 24 receives at its input a measured load current vector $i_o$ and produces an output voltage vector $u_o$. The load regulator 24 can be, for example, a field-oriented regulator. By applying the space vector modulation method, the control set 26 connected after the load regulator 24 calculates modulation levels m as a function of the generated output voltage vector $u_o$ and of a measured input voltage vector $u_i$. The control device 18 is preferably implemented as a digital signal processor.

The modulation device 20 connected after the control device 18 has on the input side a modulator 28 and on the output side for each matrix converter phase a commutation controller 30, 32, and 34. Depending on the applied drive level m, the modulator 28 generates pulse-width-modulated signals which are each checked and processed in the commutation controllers 30, 32, and 34 with respect to blocking time, minimum on period and open time. The commutation controllers 30, 32, and 34 need to know the polarity of the linked input voltages of the matrix converter 2 which are described by an input voltage space vector $u_i$. Control signals (On/Off signals) are provided at the outputs of the commutation controllers 30, 32, and 34, which are converted by a driver device 22 into a gate signal which is independent of the specific embodiment of the bidirectional power switch 4. The modulation device 20 is preferably implemented by a Programmable Logic Device, in particular a field programmable gate array.

According to the diagram of FIG. 3, the control set 26 of the matrix converter 2 supplies a commutation sequence A, B, C for a half modulation period T, with a mirror-symmetric modulation (triangular baseline overshoot method) depicted in FIG. 3. As also seen in the diagram, the potential levels A and B of two input voltages of the matrix converter 2 are very close to each other. I.e., the polarity of the linked voltage between the two input voltages with the potential levels A and B is uncertain, which is detected by the modulator 28. As described above, since an erroneous measurement of the voltage polarity causes a short-circuit of the linked voltage, the method disclosed at the PCIM Conference not commutate directly between the potential levels A and B, and a bypass commutation is performed instead. In other words, the commutation proceeds from the potential level A to the potential level C and immediately thereafter from the potential level B to the potential level C. This is shown in FIG. 3, wherein the predetermined commutation sequence A, B, C for half a modulation period T/2 is augmented by an additional potential level C. This additional potential level C is arranged in a second row, to indicate that this is a bypass commutation which is added only when the polarity of a linked input voltage is uncertain. By using a bypass commutation, the polarity between the potential levels A and C, as well as a between C and B, can be definitely determined without requiring a highly accurate measurement technique.

It should be mentioned that, depending on the switch settings before commutation, the potentials referred to by A, B and C will have to be associated with the actual input potentials $U_X$, $U_Y$ and $U_W$, so that the description applies to more general situations.

This control method has the disadvantage that two additional commutations are performed during each modulation period T, whereby the additional commutations are performed in the presence of a large difference voltage. Since the magnitude of the commutation voltage reflects the switching losses, the switching losses are significantly increased with this control method, which is disadvantageous for the chip layout and heat sinking. The switching losses also increase due to the greater number of commutations within a modulation period T. As a further disadvantage, this problem, namely the commutation between two close potential levels, is detected only in the modulator 28 or in the commutation control 30 to 34 of the matrix converter 2.

It would therefore be desirable and advantageous to provide an improved method for controlling a matrix converter, which obviates prior art shortcomings and eliminates commutation between two close input voltages.

SUMMARY OF THE INVENTION

According to one aspect of the present invention, a method for controlling a matrix converter, with nine bidirectional power switches arranged in a 3×3 switch matrix, includes the steps of determining switching states with associated time periods for each half modulation interval in a calculated commutation sequence depending on a calculated output voltage space vector of the matrix converter; selecting a commutation sequence for a half modulation interval depending on measured input voltages and a predetermined limit value, with the commutation sequence selected so as to prevent commutation between input voltages having close potentials; comparing the selected commutation sequence with a calculated commutation sequence; and if the selected commutation sequence is different from the calculated commutation sequence, rearranging the switching states with the associated time periods so as to make the selected commutation sequence identical to the calculated commutation sequence.

The control method according to the invention for a matrix converter provides a robust voltage-controlled commutation, for which an analog measurement of the input voltages, which is required anyway for controlling the matrix converter, is sufficient. In addition, the control device connected before the modulation device takes care of the commutation problem. As a result, a matrix converter can be operated with the control method of the invention solely based on analog input voltage information and without specifically measuring the input voltages or output currents.

In addition, with the control method of the invention, only four commutations are performed during each modulation period, which significantly reduces switching losses as well as the chip area and facilitates heat sinking.

In addition, the control method of the invention is not limited to a two-stage commutation, and can be universally extended to other commutation methods, in particular to a four-stage commutation.

According to an advantageous embodiment of the invention, the predetermined limit value for recognizing close voltages can be selected so that the selected commutation sequence is valid for an entire input voltage sector. This has the advantage that the regions which are critical for the commutation can be more easily determined. In addition, the predetermined limit value can be selected so that the selected commutation sequence is valid only for a first region about a value of Zero of a linked input voltage. In particular, any desirable commutation sequence can be selected for a region of an input voltage sector that is different from the first region.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 3 shows in a diagram as a function of time t a known commutation sequence of a modulation period;

FIG. 6 depicts in a diagram as a function of time t a selected commutation sequence of a modulation period according to the invention;

FIG. 7 shows a table with calculated switching states with associated time periods; and FIG. 8 shows a table with the calculated switching states with associated time periods according to FIG. 7, which are arranged according to the selected commutation sequence.

DETAILED DESCRIPTION OF PREFERRED EMBODIMENTS

Figure 1:
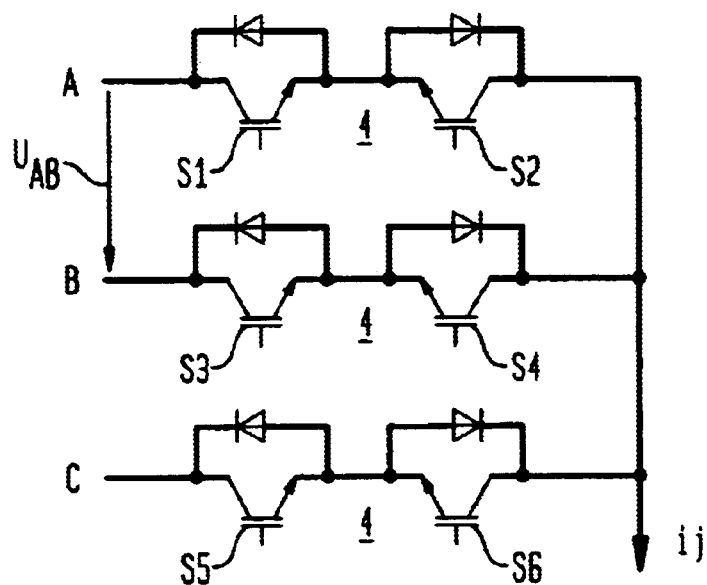
FIG. 1 shows that output phase of the matrix converter.
Figure 2:
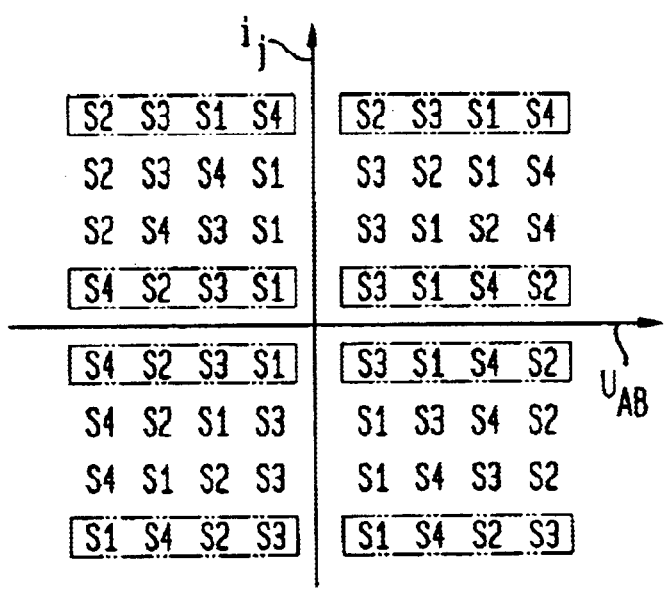
FIG. 2 depicts in a current-voltage diagram all possible commutation sequences for the semiconductor switches of bidirectional power switch of the output phase according to FIG. 1.
Figure 4:
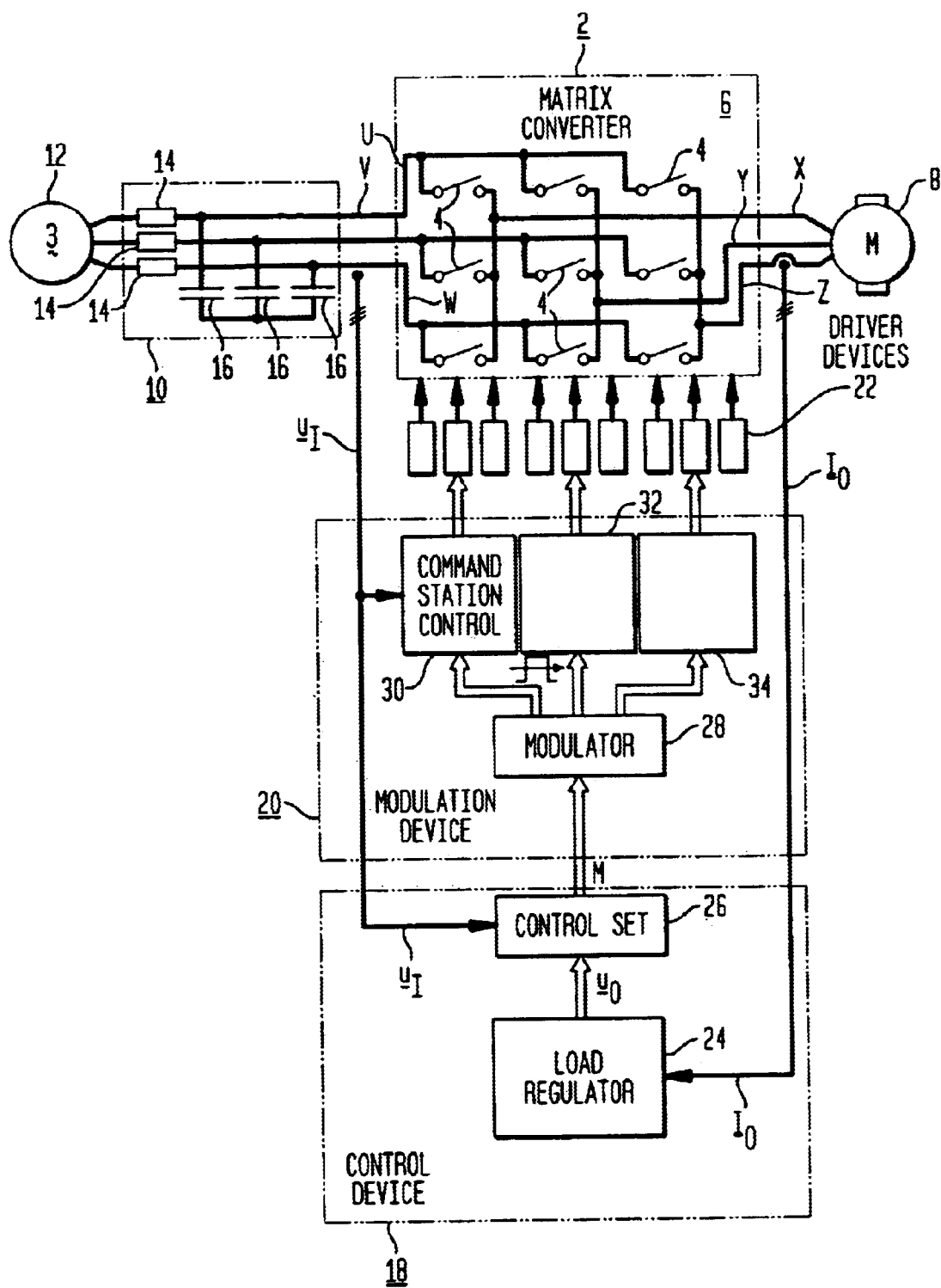
FIG. 4 shows an equivalent circuit diagram of a matrix converter.

Throughout all the Figures, same or corresponding elements are generally indicated by same reference numerals.

These depicted embodiments are to be understood as illustrative of the invention and not as limiting in any way.

Figure 5:
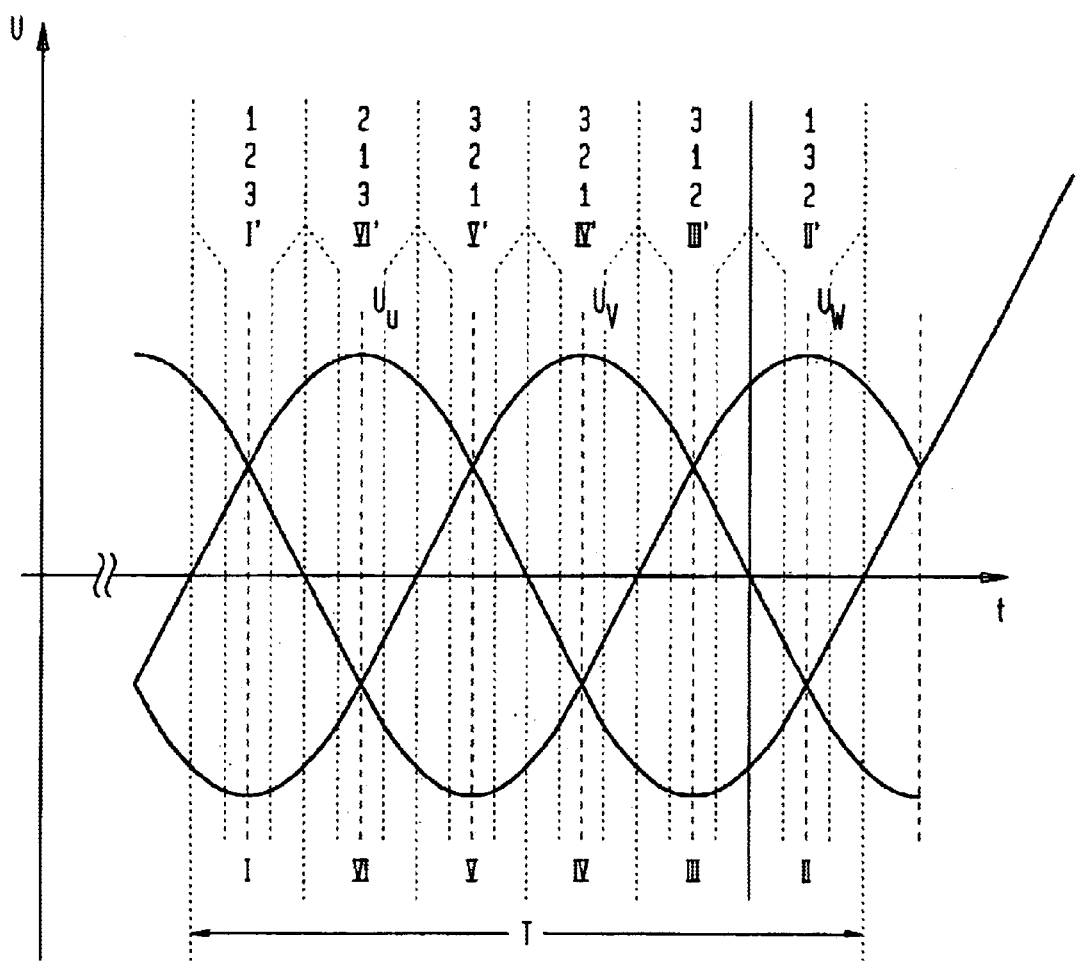
FIG. 5 shows one period of the input voltages of the matrix converter according to FIG. 4 in a diagram plotted as a function of time t.

Turning now to the drawing, and in particular to FIG. 5, there are shown in a diagram as a function of time t the line voltages $U_U$, $U_V$, $U_W$ applied to the inputs UVW of the matrix converter 2. Only the temporal curve during one line period is shown of these line voltages $U_U$, $U_V$, $U_W$. The line period is subdivided into six sectors I to VI according to the space vector modulation. Each sector I to VI includes 60° elec., wherein the sector boundary coincides each time with a zero crossing of a line voltage $U_U$, $U_V$, and $U_W$, respectively. Regions I', ... , VI' which are placed around a zero crossing of a linked line voltage are defined within the sectors I, ... , VI. The width of the regions is defined by a predetermined limit value. The limit value can be selected, for example, so that the regions I', ... , VI' are congruent with the sectors I, ... , VI. The limit value defines the region where the polarity of a linked line voltage is uncertain. The larger these regions, the less stringent are the requirements for determining the polarity of the input voltages of the matrix converter 2. If the regions I', ... , VI' are congruent with the sectors I, ... , VI, then a limit value and/or a check of the limit value can be completely eliminated. Number triads which each represents a commutation sequence are defined within the sectors I, ... , VI. The numbers of the commutation sequences operate from the top to the bottom and indicate the index of the input voltage to be selected ($1=U_U$, $2=U_V$, $3=U_W$).

FIG. 6 depicts a selected commutation sequence for half a modulation period T which does not include a commutation between two close potential levels of two input voltages of the matrix converter 2. Two close potential levels of two input voltages occur in sector I of the diagram according to FIG. 5, with the potential curve shown in FIG. 6. The input voltage $U_W$ has the potential A, the input voltage $U_U$ has the potential B, and the input voltage $U_y$ has the potential C. A determination is made based on the values of the linked input voltages $U_U$, $U_V$ and $U_W$, which input voltages are close.

The possible commutation sequences are ABC, BCA and CAB. From these three possible commutation sequences, the commutation sequence is selected which prevents commutation between two close input voltages. In sector I, the voltages are the input voltage $U_W$ with the potential A and the input voltage $U_U$ with the potential B. Accordingly, a commutation sequence has to be selected where the potentials A and B are not consecutive. The commutation sequence BCA satisfies this condition. FIG. 6 shows the mirror-symmetric commutation sequence of the selected commutation sequence BCA as a function of time t. As can be seen, only four commutations occur with the selected commutation sequence BCA, as compared to six commutations with the method presented at the PCIM Conference (see FIG. 3).

FIG. 7 shows a two-column table, with the first column showing a "Time Period" and the second column showing a "Switching State". Four active switching states 121, 122, 133 and 131 and a switching state 111 are listed in the second column for one modulation period T or half a modulation period T/2. The active switching states 121, 122, 133 and 131 generate an output voltage space vector $u_o$ that is different from zero. The switching state 111 generates an output voltage space vector $u_o$ with zero amplitude.

As seen from the table, the switching state of a matrix converter 2 can be described by a triad, such as 122. The first digit indicates the input phase of the matrix converter 2 to which the first output phase X is to be connected. The second digit indicates the input phase of the matrix converter 2 to which the second output phase Y is to be connected. And the third digit indicates input phase of the matrix converter 2 to which the third output phase Z is to be connected. According to the switching state 122, the first output phase X is to be connected with the input phase $U_U$, the second output phase X with the input phase $U_V$ and the third output phase Z of the matrix converter 2 is to be connected with the input phase $U_V$. The time interval $T\beta\mu$=a associated with this switching state indicates the duration of this switching state. When the switching state 122 is executed, the corresponding bidirectional power switches 4 are closed.

The table of FIG. 7 shows a computational example from the published reference Huber, Borojević, in particular Table III and FIG. 9 therein, which is obtained in the input voltage sector I by assuming an input power factor of cos φ=1.

FIG. 8 shows a table with the calculated switching states 121, 122, 133, 131 and 111 together with the associated time periods a, b, d, e, and c according to FIG. 7. The switching states in the table of FIG. 8 are rearranged as compared to the switching states in the table of FIG. 7. As already mentioned above, the switching states of table of FIG. 7 are associated according to Huber and Borojević with the sector VI, assuming a power factor of cos φ=1. The sector VI has according to FIG. 5 a commutation sequence of 213. When considering the mirror-symmetry with potential levels A, B and C, the commutation sequence is CAB. A comparison between the selected commutation sequence CAB=213 and the commutation sequence of the calculated switching states of the table according to FIG. 7 shows the absence of a match. The calculated switching states of the table of FIG. 7 can be rearranged since the order of the desired potentials can be arbitrarily changed within the modulation period T, without changing the resulting average output voltage within a modulation period T. I.e., the calculated switching states are rearranged consecutively so as to give rise to the selected commutation sequence CAB=213. The table of FIG. 8 shows these switching states for half a modulation period T. If the selected commutation sequence CAB=213 is to be valid for the entire sector VI, then the predetermined limit value for the region VI' has to be selected so that the region VI' is congruent with the sector VI.

According to the control method of the invention for the matrix converter 2, only those commutation sequences are selected from a control set 26 that eliminate commutation between two close input voltages at least in the range proximate to the zero crossings of the linked input voltages, thereby eliminating the risk of a commutation short-circuit. If the control set proposes a commutation sequence that is different from the three possible commutation sequences, then this commutation sequence is converted into the selected commutation sequence by a rearranging the calculated switching states.

The control method according to the invention for a matrix converter 2 has the following advantages over the method disclosed at the PCIM Conference:

The method of the invention no longer requires a specific measurement of the polarity. It is entirely sufficient to measure the analog input voltages $U_U$, $U_V$ and $U_W$, which are required in any case for determining the pulse width for the modulator 28. All information required for controlling the commutation is included in the commutation sequence, so that no additional voltage polarity signals have to be transmitted to the commutation controller. With the method according to the invention, a matrix converter can be operated for the first time solely on the basis of analog input voltage information, without requiring additional measurements of the polarity of input voltages or output currents. This simplifies the electronics and reduces the cost of a matrix converter.

With the method of the invention, only four commutations take place during a modulation period. This significantly reduces switching losses, decreases the chip area and improves heat sinking. The method according to invention can be employed independent of specific commutation methods and is therefore universally applicable, a particular also for four-step commutation.

The method according to the invention achieves a robust commutation control which is independent of precise measurements.

With the method of the invention, errors in the average output voltage over a modulation period are prevented, since no bypass commutation takes place.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. A method for controlling a matrix converter, with nine bidirectional power switches arranged in a 3×3 switch matrix, comprising the step of:

determining switching states with associated time periods for each half modulation interval in a calculated commutation sequence depending on a calculated output voltage space vector of the matrix converter;

selecting a commutation sequence for a half modulation interval depending on measured input voltages and a predetermined limit value, with the commutation sequence selected so as to prevent commutation between input voltages having close potentials;

comparing the selected commutation sequence with a calculated commutation sequence; and if the selected commutation sequence is different from the calculated commutation sequence, rearranging the switching states with the associated time periods so as to make the selected commutation sequence identical to the calculated commutation sequence.

2. The method of claim 1, wherein the predetermined limit value is selected so that the selected commutation sequence is valid for an entire input voltage sector.

3. The method of claim 1, wherein the predetermined limit value is selected so that the selected commutation sequence is valid only for a first region about a value of Zero of a linked input voltage.

4. The method of claim 3, wherein any desirable commutation sequence can be selected for a region of an input voltage sector that is different from the first region.

* * * * *